No. 707,256. Patented Aug. 19, 1902.
J. W. REAMES & C. F. HEFFINGTON.
SWINGING GATE.
(Application filed Apr. 24, 1902.)
(No Model.) 2 Sheets—Sheet 2.
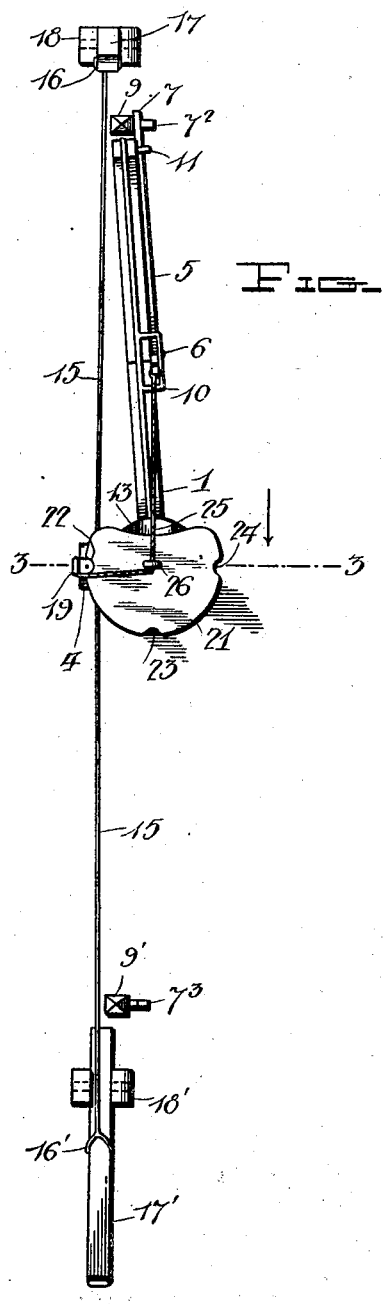
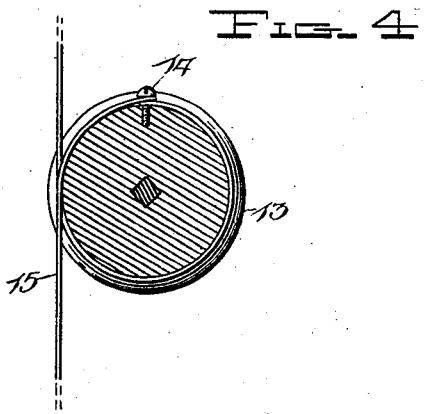
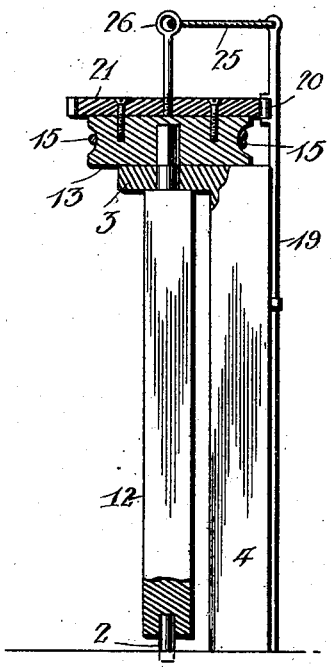
Inventors
John W. Reames and
Calvin F. Heffington
Witnesses
By H. B. Willson & Co.
Attorneys

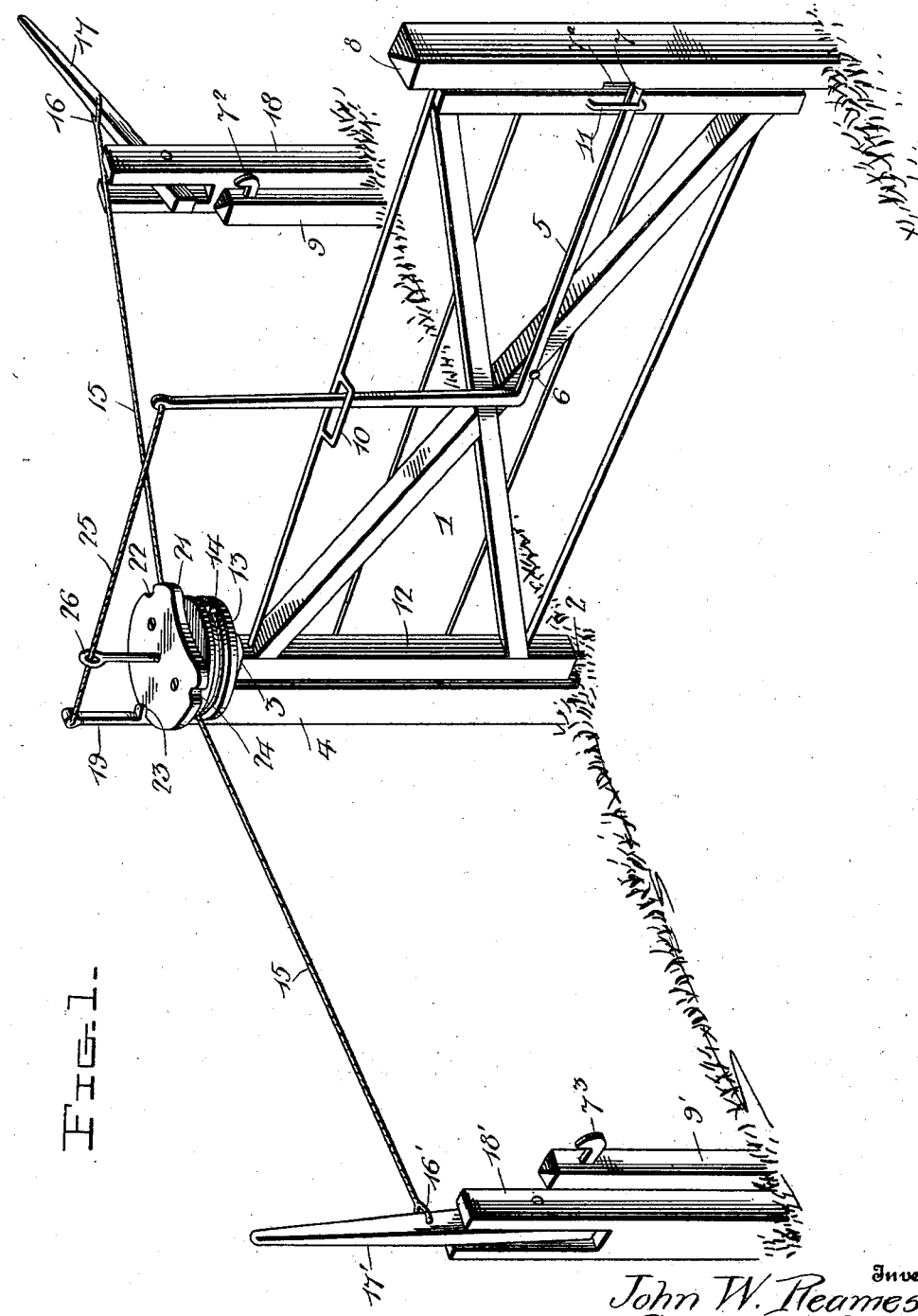

UNITED STATES PATENT OFFICE.

JOHN W. REAMES AND CALVIN F. HEFFINGTON, OF CORLEY, ARKANSAS.

SWINGING GATE.

SPECIFICATION forming part of Letters Patent No. 707,256, dated August 19, 1902.

Application filed April 24, 1902. Serial No. 104,531. (No model.)

*To all whom it may concern:*

Be it known that we, JOHN W. REAMES and CALVIN F. HEFFINGTON, citizens of the United States, residing at Corley, in the county of Logan and State of Arkansas, have invented certain new and useful Improvements in Swinging Gates; and we do declare the following to be a full, clear, and exact description of the invention, such as will enable others skilled in the art to which it appertains to make and use the same.

This invention relates to improvements in swinging gates.

The object of the invention is to provide improved means whereby a gate may be opened in either direction by a person standing on the ground or seated in a vehicle or upon a horse and as readily closed when the person has passed through the gateway, as well as to provide automatic means for locking and unlocking the gate in either of its three positions.

With the above and other objects in view, which will readily appear as the nature of the invention is better understood, said invention consists in certain novel features of construction and combination and arrangement of parts, which will be hereinafter fully described, defined in the appended claims, and illustrated in the accompanying drawings, in which—

Figure 1 is a perspective view showing the gate closed. Fig. 2 is a top plan view showing the gate opened in one direction. Fig. 3 is a vertical section on line 3 3 of Fig. 2. Fig. 4 is a horizontal section through the grooved pulley wheel or disk. Fig. 5 is a fragmentary face view of the main latch-post, showing the keeper.

Referring now more particularly to the drawings, the numeral 1 represents a gate mounted to swing in either direction upon a bottom pivot 2 and a top bracket 3, the former extending up from the ground or a suitable base and the latter projecting from a hinging-post 4, and may be of any preferred form and construction to serve as a farm, garden, or other gate. This gate carries an L-shaped latch-lever 5, pivotally mounted at 6, so that the horizontal arm thereof may swing in a vertical plane. The free end of the said horizontal arm of the lever forms a latch 7 to engage a keeper 7' on the main latch-post 8 and keepers $7^2$ $7^3$ on the auxiliary latch-posts 9 9'. The main latch-post 8 is disposed opposite the hinging-post 4 in the usual manner, while the posts 9 9' are arranged in line with and at a suitable distance from the post 4 on opposite sides of the gate. The horizontal and vertical arms of the latch-lever are arranged to move in suitable guides 10 and 11 on the gate.

Fixed to the pivot-post 12 of the gate is a grooved pulley or disk 13, to which is centrally secured by a suitable fastening 14 a continuous wire, cable, or rope 15, the ends of which are reversely passed or wound one or more times therearound and thence extended to form flexible connections 16 16', connected to hand-levers 17 17', pivoted to posts 18 18' on opposite sides of the gate and adjacent to the latch-posts. By means of these levers the gate may be opened and closed from either side of the gateway by a person standing on the ground or seated in a vehicle or upon a horse in a manner clearly obvious, the outward movement of the lever 17 causing the gate to swing toward the auxiliary latch-post 9', while the outward movement of the lever 17' causes the gate to swing in the reverse direction, or toward the auxiliary latch-post 9. When the gate is thrown open by either lever, the operator on passing through the gateway operates the other lever to restore the parts to their normal position and to swing the gate closed, the connections between the levers and pulley effecting the simultaneous action of both levers, as will be readily understood. Hence a person desirous of passing through the gateway would first operate the adjacent lever to swing the gate open and on passing to the other side of the gate would then operate the other lever to swing the gate closed.

In connection with the means for opening and closing the gate automatic locking and unlocking mechanism is employed, the same consisting of a spring-arm 19, provided with a friction-roller 20, which bears upon the periphery of a cam head or disk 21, fixed to or formed integrally with the pulley 13, said cam head or disk having recesses 22, 23, and 24, equidistantly arranged, to receive said roller. The upper end of the arm 19 is attached to the vertical arm of the latch-lever 5 by a flexible connection 25, which extends through a suitable guide 26, projecting upward from the cam-head. When the gate is closed, the roller 20 seats itself within the intermediate recess 22 and the latch engages the keeper on the main latch-post 8, whereby the gate is locked in closed position. When the lever 17 is operated to swing the gate toward the auxiliary latch-post 9', the cam-head turns and forces the arm 19 backward, whereby the connection 25 is drawn upon to tilt and release the latch-lever 5 from engagement with the keeper 7' on the main latch-post 8. The gate is then free to swing, and as it moves toward the auxiliary latch-post 9' the roller 20 traverses the edge of the cam until the latch 7 comes immediately above the keeper $7^3$ and the roller snaps into the recess 23, thereby releasing the latch-lever, whereupon the latch 7 drops by gravity into engagement with said keeper. Upon the operation of the lever 17' to swing the gate closed the roller first rides out of the recess 23, causing the arm 19 to tilt the latch 7 out of engagement with the keeper $7^3$, and then as the latch enters the keeper 7' the roller again enters the recess 22 and allows said latch to drop down and engage said keeper. When the gate is swung in the reverse direction by the lever 17', the friction-roller 20 travels between the recesses 22 and 24 and the latch 7 is engaged with and released from the keepers 7' and $7^2$ in the same manner as described with relation to the coöperation of the latch with said keeper 7' and the keeper $7^3$. Thus it will be seen that the action of the cam pushes back the arm 19 to release the latch and that by means of the cam-recesses the arm is allowed to move forward when the gate is closed or fully opened in either direction to permit the latch to engage the keepers. The keeper 7' is formed by a recess in the face of the post 8, which recess is located below a transverse passage $7^a$, which allows the latch to enter and leave the keeper from either side. When either lever is pulled, the gate is tilted slightly, as before described, and as the latch is allowed to have some transverse play in the keeper the gate is permitted to have an initial swing sufficient to give the cam the requisite movement to force the arm 19 back and cause the upward tilting of the latch-lever, whereby the latch is disengaged. The upper wall of the passage $7^a$ is properly inclined on opposite sides of a central point $7^b$ to guide the latch in its movements.

From the foregoing description, taken in connection with the accompanying drawings, it is thought that the construction, mode of operation, and advantages of our improved swinging gate will be readily apparent without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In a swinging gate, the combination with suitable keepers located in line with the gate in its closed position and on opposite sides of the gate; of suitable operating means and connections whereby the gate may be swung in either direction to an open or closed position from either side of the gateway, a gravity-latch upon the gate to engage the keepers, a spring-arm connected with the latch, and a cam movable with the gate and adapted to push back the spring-arm to effect the disengagement of the latch, said cam having recesses in which the arm may seat itself at proper times to allow the latch to move into engagement with the keepers, substantially as specified.

2. In a swinging gate, the combination with suitable keepers located in line with the gate in its closed position and on opposite sides of the gate; of suitable operating means and connections, whereby the gate may be swung in either direction to an open or closed position from either side of the gateway, a pivoted L-shaped latch-lever mounted upon the gate and having one of its arms forming a latch to engage the keepers, a spring-arm, a connection between the spring-arm and other arm of the lever, and a cam movable with the gate and adapted to push back the spring-arm to effect the disengagement of the latch, said cam having recesses in which the arm may seat itself at proper times to allow the latch to move into engagement with the keepers, substantially as and for the purpose described.

In testimony whereof we have hereunto set our hands in presence of two subscribing witnesses.

JOHN W. REAMES.
CALVIN F. HEFFINGTON.

Witnesses:
R. B. SHEEHAN,
P. D. SMITH.